March 23, 1943. W. R. BREND 2,314,386
PIPE JOINT
Filed Jan. 14, 1942
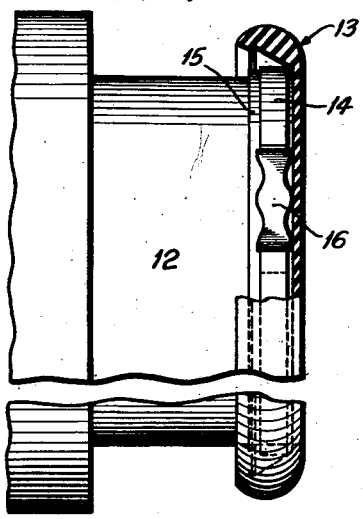
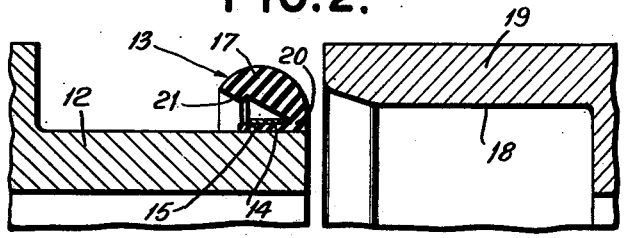
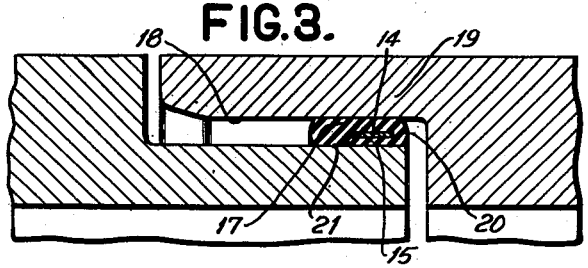
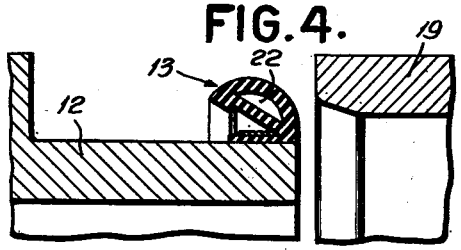
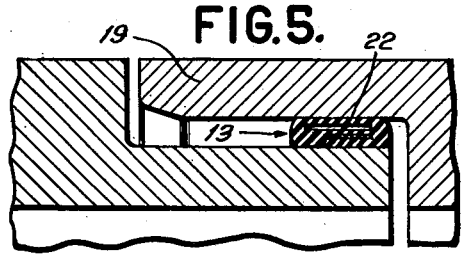
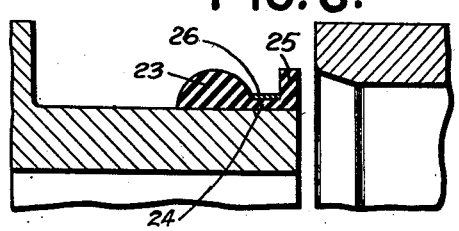
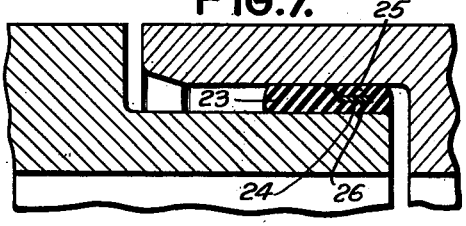
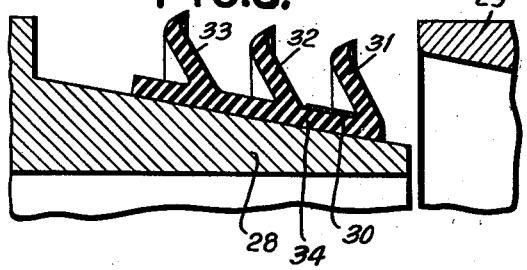
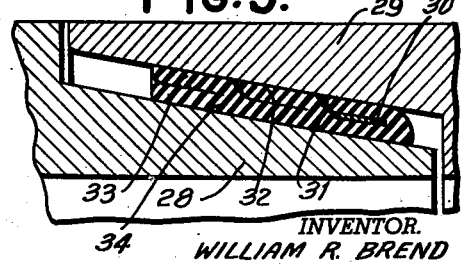
INVENTOR.
WILLIAM R. BREND
BY John C. Kent
ATTORNEY.

Patented Mar. 23, 1943

2,314,386

UNITED STATES PATENT OFFICE 2,314,386

PIPE JOINT

William R. Brend, East Orange, N. J., assignor to Lock Joint Pipe Company, East Orange, N. J., a corporation of New Jersey Application January 14, 1942, Serial No. 426,712

6 Claims. (Cl. 285—163)

This invention relates to pipe joints. Among the objects of the invention is to provide a method and means for assuring indisplaceability of a rubber gasket along an unbuttressed surface within a joint.

Rubber gaskets have experienced wide acceptance for sealing pipe joints. In some form of joints grooves are provided for receiving the gaskets and frequently the gasket and groove are designed and proportioned to produce conditions cooperating in the security of the seal. In other types of joint the security of the seal is entirely dependent upon the rubber gasket and the pressure exerted thereby upon opposite wall surfaces of the two joined pipe elements without regard to other gasket-confining walls which may or may not be present. When large pipes are employed or high pressure pipe lines are constructed it is important that a predetermined location of the gasket be maintained. This is particularly true when a pipe line is being laid under water and the joints cannot be tested until the line is completed. Several modes of holding gaskets in place at all times have been proposed, but many of these are not altogether dependable, particularly when used with large and heavy pipes, because of the indeterminable forces which act upon the gasket when the joining elements are being engaged. The opening of joints in which cementitious material has been employed to fasten the gasket to one of the joining elements has frequently disclosed a gasket which has been loosened and displaced from its intended position, either in part or throughout its entire circumference, with resulting leakage through the joint. It is therefore among the objects of the present invention to provide a rubber gasket and securing means which together afford considerable dependability against displacement of the gasket, or of any portion thereof.

Another object of the invention is to provide a form of gasket which will completely encase mechanical attaching means so as to protect the same from the deleterious action of the elements while the mechanical means functions to hold the gasket in place against any tendency to become dislodged because of the high pressures to which the joint is subjected or because of movement between joined pipes. Other objects and advantages of the invention will appear more fully from the following descriptions and claims.

In the drawing, Fig. 1 illustrates the spigot end of a pipe with a gasket secured in place.

Fig. 2 is a partial section of the joining elements whose opposing faces are substantially cylindrical.

Fig. 3 illustrates the joining elements of Fig. 2 with the joint closed.

Fig. 4 is a cross-section showing a modified form of gasket.

Fig. 5 is a section of the joint of Fig. 4 when closed.

Figs. 6 and 7 illustrate, respectively, sections of another form of gasket and securing band before and after encasement within a joint, and Figs. 8 and 9 illustrate, respectively, open and closed joining elements which have opposite surfaces at an angle to the axis of the pipe.

The different forms of cross-sections shown in the drawing are shown by way of illustration and as examples of gasket strippings which are well suited for attaining the objects of the present invention. The stripping is preferably of soft rubber, but a composition having the deformable and sealing properties of rubber may be employed.

The stripping is usually molded in an indeterminate length from which shorter lengths are cut to form individual gaskets. A gasket is prepared by cutting a piece of stripping having a length short of the outside circumference of the spigot or other male joining element so as to form a contracting ring upon the spigot when its ends are fastened together. The ends may be cemented or vulcanized together, or a form of staple or clamp may be used to accomplish a tie. When the gasket has been formed into a ring of desired size, it is mounted upon the spigot and adjusted to the position in which it is intended to remain within the joint. Since the interior of the gasket has a circumference less than that of the surface upon which it is mounted, the ring is in tension and exerts a frictional grip on the surface upon which it is mounted.

An example of a suitable stripping is illustrated in cross-section in Fig. 2. The stripping has a stem portion which provides a substantial bearing area to fit the contour of the pipe 12. It is also provided with a bulbous portion containing a volume of rubber essentially for exerting sealing pressure between confining surfaces within a joint. The bulbous portion and the stem portion are joined together in such a manner that the two portions are hingedly connected and constitute an integral rubber ring when formed into a gasket. The ring is as though split from one side, or from near one side, with a cut intermediate its interior and exterior circumferences.

After the gasket 13 has been mounted in place, such, for example, in the manner shown in Fig. 1, a retaining band 14 is seated upon the footing or stem portion 15 which is provided for that purpose. The retaining band is then tensioned sufficiently to firmly compress the engaged portion of the gasket against the bearing surface of the spigot throughout its entire circumference. When this has been accomplished, the ends of the band are secured together by a suitable banding tool. For this purpose I have found it convenient to employ a banding tool which will stretch the band and then clamp a metallic sleeve 16 which is impressed laterally with notches simultaneously formed in the edges of the seal and band. These tools are readily obtainable upon the market and are commonly used by shippers who employ them for wrapping bundles with wire or steel strapping. Similar tying materials are suitable for the purpose of the present invention. The use of a relatively wide band is preferred since this provides considerable gripping surface upon the portion of the gasket which engages the surface of the spigot. It will be appreciated that for gaskets designed for certain uses, such, for example, when the working pressures upon the joints are relatively small and the material of the gasket is sufficiently stout to resist cutting by the tension produced in the band, the band may be in the form of a round wire.

One function of the band is to prevent the gasket from being blown inwardly or outwardly of the joint due to internal or external pressure.

Again referring to Fig. 1 it will be observed that the bulbous portion of the gasket 13 which is outside of the band 15 forms a bead 17 which circumscribes the outer sealing line of the gasket. In its natural and unrestrained condition it is dome-shaped and tends to project outside of the inner surface 18 of the bell element 19. When the bell is advanced over the spigot, the dome-shaped portion or bead 17 is folded about the neck 20 which connects the portions 15 and 17 and acts as a hinge. Continued movement of the bell and spigot into engaging relationship causes the deformation of the bead in the manner generally illustrated in Fig. 3. The tendency of the bead to resist deformation causes high pressure to be exerted on the opposite walls of the two joined elements.

The free edge of the bead has an extending lip 21 which is located in an arcuate path outside of the width of the retaining band 14 so as to assure that the retaining band is completely enclosed and surrounded by the material of the gasket when the joint is closed, as illustrated in Fig. 3. Because of its ability to withstand tension it is preferable that the retaining band be made of steel and it is therefore desirable that the band be completely encased within the gasket in the manner described so as to prevent its corrosion.

Figs. 4 to 7, inclusive, illustrate cross-sections of other forms of gaskets. The gasket illustrated in Figs. 4 and 5 is similar to that illustrated in Figs. 2 and 3 and operates in much the same manner although it has a different distribution of rubber. It has an inner channel 22 which provides space for easing the flow of the material of the gasket as it is deformed from its natural condition when the joint is being closed.

The gasket illustrated in Figs. 6 and 7 has a bulbous portion or bead 23 which directly contacts with the spigot surface of the pipe in the same ring as the web or stem portion 24. This bulbous section is considerably deformed, as illustrated in Fig. 7, when the pipe joint containing the same is closed. The upstanding flange 25 is preferably so proportioned as to completely overlie and encase the steel band 26 when within a closed joint, Fig. 7. It is to be noted, however, that the band is completely shut off, in any event, from the interior and exterior of the pipe by flanking circles of rubber under sealing pressure.

As shown in Figs. 8 and 9, the spigot and bell elements 28 and 29, respectively, of connected pipes have the opposite bearing surfaces tapered with respect to the axis of the pipe. In these figures I have shown another form of gasket which is secured in place upon the bell by means of a tensioned band 30. The gasket has a plurality of flanges 31, 32 and 33 extending at an angle to the base portion 34 of the gasket, and the retaining band 30 is mounted between a pair of these flanges. When this joint is closed, the flange adjacent the retaining band and extending thereabove is folded over in the manner illustrated in Fig. 9. The flange 31 preferably is sufficiently long to close the space between itself and flange 32 so as to completely overlie the steel band.

In the joint of Figs. 8 and 9 there is sufficient taper in the inclination of the inner bearing surface of the bell to facilitate the effort of connecting the pipe ends together, but when the opposite bearing surfaces are cylindrical or substantially so it is preferable to provide a slope at the forward end of the bell as shown in Figs. 4 to 7, inclusive. This is particularly so with heavy concrete pipe because in such case considerable force is required to deform a rubber gasket to contain it in the restricted space provided within the joint. The greater the joining force required to deform the gasket, the greater the radial pressure upon the enclosing surfaces of the bell and spigot and the firmer the seal against leakage past the gasket. Rubber is a relatively incompressible material and the volume of the thickness of the gasket which exceeds the radial dimension between the opposing bearing surfaces of the joint when the gasket is unrestrained is extended along the annular space between the bearing surfaces when the joint is closed. This enlarges the contacting and effective sealing surface areas of the gasket.

1. A pipe joint comprising a spigot having an exterior bearing surface, a bell having an inner bearing surface providing clearance between itself and the bearing surface of the spigot, a sealing gasket mounted upon the bearing surface of said spigot, a tensioned band overlying a portion of said gasket and producing compression in said portion of the gasket to cause frictional adherence thereof with the bearing surface of the spigot, said gasket having a bead hingedly connected with the portion of said gasket which is held in frictional adherence upon said spigot, said bead extending beyond the diameter of the bearing surface of the bell when unrestrained but being displaceable on its hinge to form a gasket into a compressed sealing closure between the bearing surfaces of said bell and spigot.

2. A pipe joint comprising a bell and spigot with opposing surfaces spaced from each other, a sealing gasket in engagement with the opposing surfaces of said bell and spigot, and a tensioned band engaging said gasket and holding it in place on the spigot to prevent its movement along the bearing surfaces, said tensioned band being so positioned with respect to the sealing gasket as not to be engageable with either of the opposing surfaces of said bell and spigot.

3. A pipe joint comprising bell and spigot joint elements having opposing bearing surfaces spaced from each other, a sealing gasket having a portion thereof overlying the exterior surface of said spigot, means for holding said portion in frictional engagement with the exterior surface of said spigot, said sealing gasket also having a portion upstanding from the first-named portion for a length beyond the inner diameter of the bearing surface of said bell when unrestrained, said last-named portion being sufficiently extensive to overlie and cover said tensioned band by which the gasket is held from displacement along the joint.

4. A rubber gasket having a cross-section with a ring portion formed with a substantial bearing area to fit the contour of a pipe and a bulbous portion providing a bead containing a volume of rubber essentially for exerting sealing pressure between confining surfaces within a joint, said bead being integral with the ring portion so as to be secured to a pipe surface by attachment of the ring portion thereto.

5. A rubber gasket having a cross-section with an underlying stem portion for forming a footing and an attached bead portion having an area exceeding that of the stem portion and normally overlying the stem portion.

6. A pipe joint comprising bell and spigot joint elements having opposing surfaces spaced from each other, a sealing gasket in the space between said opposing surfaces, said sealing gasket having a cross-section comprising at least two connected portions whose combined thickness of material is greater than said space between the opposing surface of the bell and spigot before confinement within the joint, and a tensioned band overlying one of said connected portions and securing the same to the spigot surface of said joint, with the second of said connected portions of the sealing gasket overlying said tensioned band when within the joint and together with the portion of the gasket underlying the tensioned band wholly encasing the tensioned band within the material of the gasket by virtue of the distortion of the gasket effected by its confinement within the joint.

WILLIAM R. BREND.

CERTIFICATE OF CORRECTION.

Patent No. 2,314,386. March 23, 1943.

WILLIAM R. BREND.

It is hereby certified that error appears in the printed specification of the above numbered patent requiring correction as follows: Page 2, second column, line 52, before "1. A pipe joint" insert --What is claimed is:--; and that the said Letters Patent should be read with this correction therein that the same may conform to the record of the case in the Patent Office.

Signed and sealed this 11th day of May, A. D. 1943.

Henry Van Arsdale,
Acting Commissioner of Patents.